Nov. 8, 1960  J. W. TRISCHKA  2,959,683
ELECTRIC RESONANCE VOLTAGE STANDARD
Filed Oct. 22, 1958  3 Sheets-Sheet 2

INVENTOR.
JOHN W. TRISCHKA
BY
Louis B. Applebaum
ATTORNEY

Nov. 8, 1960 J. W. TRISCHKA 2,959,683
ELECTRIC RESONANCE VOLTAGE STANDARD
Filed Oct. 22, 1958 3 Sheets-Sheet 3

INVENTOR.
JOHN W. TRISCHKA
BY
Louis B. Applebaum
ATTORNEY

United States Patent Office 2,959,683
Patented Nov. 8, 1960

2,959,683

ELECTRIC RESONANCE VOLTAGE STANDARD

John W. Trischka, Syracuse, N.Y., assignor, by mesne assignments, to the United States of America as represented by the Secretary of the Navy Filed Oct. 22, 1958, Ser. No. 769,047

6 Claims. (Cl. 307—63)

This invention relates to molecular beam apparatus and especially to equipment which employs the resonance of a molecular beam in providing a standard voltage.

Present voltage standards include the current balance, the silver voltameter and the Weston standard cell. The current balance has an accuracy of about 1 part in 100,000, while the latter two and the present invention have an accuracy of about 1 part in 1,000,000. In producing a standard voltage, the silver voltameter and the Weston cell employ chemical effects, while the electric resonance voltage standard utilizes the inherent physical properties of single molecules, i.e., the change in the energies of single molecules in the presence of an electric field.

The objects and advantages of the present invention are accomplished by strict control of the resonance condition of a molecular beam so that the energy output of the beam is a constant.

In a typical embodiment, a molecular beam passes through a series of D.C. electric fields one of which has an alternating field superimposed thereon. The frequency of the A.C. field is maintained constant by a frequency standard, such as a crystal, and the value of the D.C. field is maintained constant by providing a highly stable source of D.C. supply voltage, a feedback control circuit which compensates for changes in the D.C. field and a servomechanism for maintaining the separation of the high precision plates of the D.C. field at a constant value.

The energy state of the molecular beam is controlled by a voltage across the plates which set up the D.C. field on which the A.C. field is superimposed.

An object of this invention is to provide a new type of voltage standard, which employs the resonant energy of molecules in a molecular beam.

Other objects and many of the attendant advantages of this invention will be readily appreciated as the same becomes better understood by reference to the following detailed description when considered in connection with the accompanying drawings wherein—

It is known that in molecular-beam, electric resonance apparatus the frequencies of the spectral lines depend on the particular molecule selected and on the electric field strength in the homogeneous or C-field. Conversely, through stabilization of the transition frequency, it is possible to stabilize to a high degree of precision the electric field strength of the C-field. This field is obtained by applying an electromotive force to a pair of parallel plates so that the field (E) is related to the voltage (V) on the parallel plates of the C-field by the equation $$E = \frac{V}{d}$$

where $(d)$ is the separation between the plates. Thus, the stability of the voltage (V) across the plates depends on the stability of the separation $(d)$ between the plates and the stability of the field, as well as the frequency stability.

Figure 1:
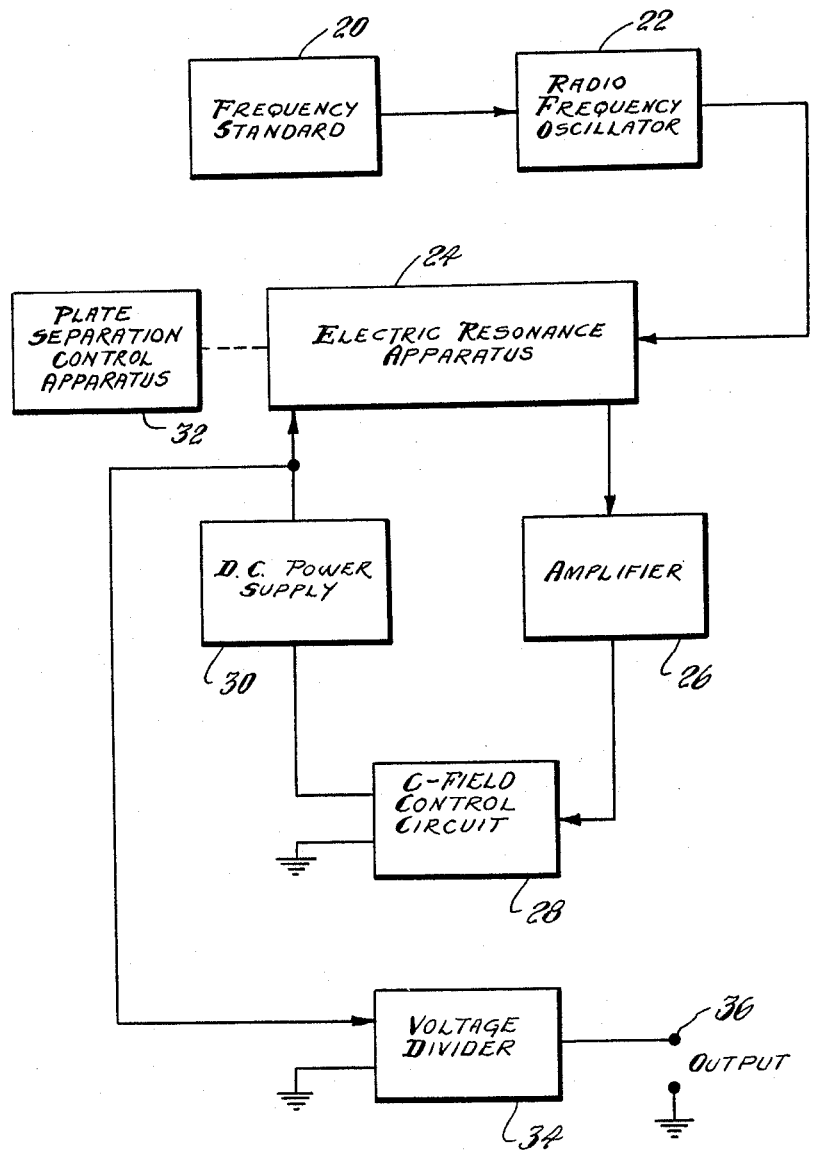
Fig. 1 is a block diagram of the invention.

In Fig. 1, a conventional radio-frequency oscillator 22, whose frequency is stabilized by a frequency standard 20 which may be a crystal, for example, is connected to apply its output signal across the C-field plates of an electric resonance apparatus 24.

The electric resonance apparatus 24 may be similar to that described by H. K. Hughes on page 614 of the magazine Physical Review, vol. 72, 1947. Standard types of molecular beam sources and detectors are also described in Prof. Norman Ramsey's book Molecular Beams, published in 1956 by Clarendon Press (Oxford).

Figure 2:
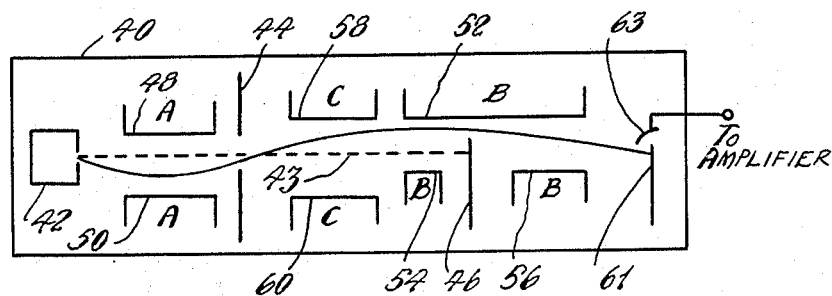
Fig. 2 is a simplified diagrammatic representation of the electric resonance apparatus.

Fig. 2 illustrates schematically an electric resonance apparatus similar to that described by Hughes. This apparatus is enclosed by an envelope 40 in which a high vacuum is maintained. In the absence of electric fields, the molecular-beam-forming oven 42 projects a molecular beam 43 through a collimating slit in a wall 44 to a beam stop 46. In the presence of two non-homogeneous D.C. fields (A and B) and one homogeneous D.C. field (C) established by suitable electromotive forces applied across parallel plates 48—50, 52—54—56, and 58—60, respectively, and with an alternating field of proper frequency superimposed on the C-field, molecules in a particular rotational state and a particular state of space quantization are bent around the beam stop 46 and follow a sigmoid path to wire 61. Wire 61 is maintained at a temperature sufficiently high to ionize the molecules which are then gathered by a negatively charged plate 63, the wire and plate forming the beam detector. The alternating, or oscillating, field is adjusted to a frequency corresponding to either a change in the rotational state or a change in the state of space quantization of the molecules in the beam.

Figure 3:
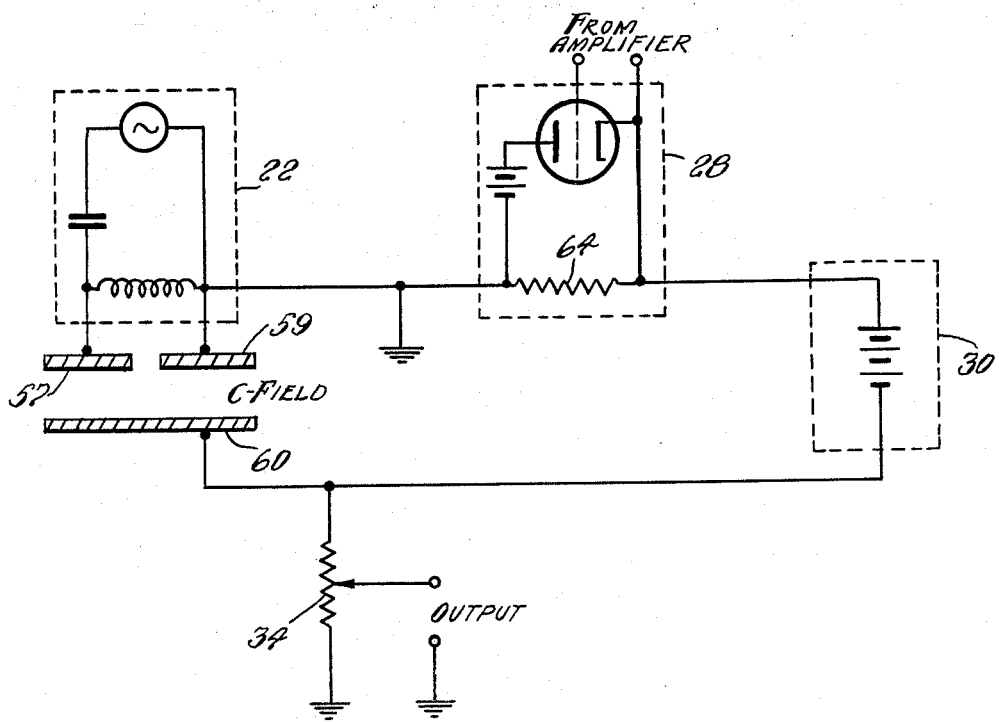
Fig. 3 is a simplified schematic circuit diagram showing some of the blocks of Fig. 1 in more detail.
Figure 4:
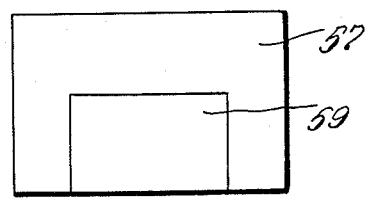
Fig. 4 is a plan view of one of the C-field plates.

The molecules attracted by the detector plate 63 form a current which is proportional in amplitude to the voltage across the C-field plates. The current is amplified by amplifier 26 and fed to the C-field control circuit 28. Fig. 3 shows the C-field control circuit 28, the C-field plates, the oscillator 22, voltage divider 34 and D.C. power supply in somewhat greater detail. One of the C-field plates 58 is split into two parts 57 and 59 (see Fig. 4) which are insulated from each other. The output of the radio-frequency oscillator 22 is applied across these two parts 57 and 59 of the C-field plate 58.

The D.C. power supply may be any source of stable D.C. voltage such as the battery shown in Fig. 3, or a highly stabilized electronic supply.

The C-field control circuit 28 may comprise an amplifier having an output resistor 64 which is in series with the D.C. power supply 30 and the plates 59 and 60 of the C-field. In operation, if the D.C. voltage across the C-field increases for any reason, the beam current drops and a change in input voltage to the control circuit 28 occurs in such a direction as to raise the voltage across the resistor 64. This voltage bucks that of the D.C. power supply 30 and therefore less voltage is applied to the plates of the C-field. Conversely, if the D.C. voltage across the C-field decreases, the control circuit 28 acts to apply a higher D.C. supply voltage across the plates. In this manner, a constant voltage is maintained across the C-field plates.

Figure 5:
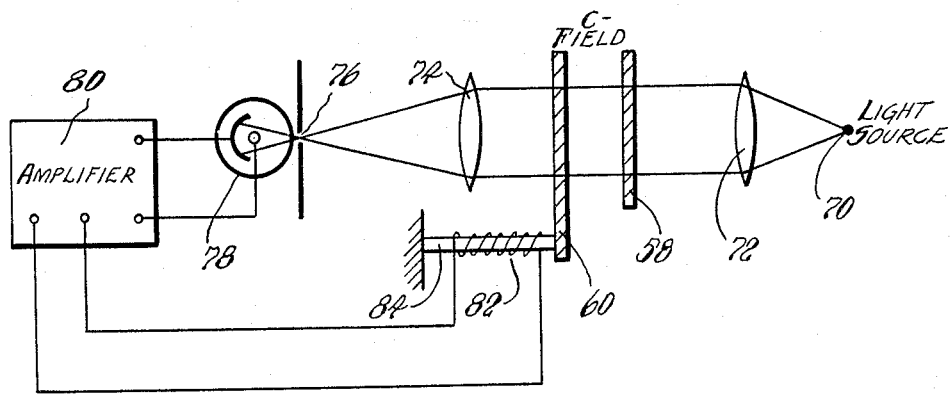
Fig. 5 is a diagrammatic representation of the electro-optical apparatus which controls the separation of the C-field plates.

The spacing between the upper and lower C-plates 58 and 60 is maintained constant by a suitable plate separation control apparatus 32. One such apparatus which may be employed is shown in Fig. 5. Here, the C-field plates 58 and 60 are made of highly polished, optically flat glass, coated on the facing surfaces with a semi-transparent gold film. A monochromatic light source 70 supplies light which is projected by a lens system 72, 74 through the plates and a slit 76 upon a photo cell 78. The light, on transmission through the C-field plates 58 and 60, produces interference fringes. If one of the fringes is focused on the photocell 78, the light reaching the cell 78 changes when the fringe shifts its position, a condition which occurs whenever the spacing between the plates 58 and 60 varies. This produces a change in the value of photocell output current which is amplified by amplifier 80, thereby producing a change in current through the heating coil 82. Since the heating coil 82 is wrapped around a metallic rod 84 which is attached to one of the C-field plates 60, the change in current through the heating coil 82 changes the temperature of the rod 84 and its amount of thermal expansion, thereby moving the plate 60. The circuit is arranged so that the expansion or contraction of the rod 84 compensates for the original change in spacing between the C-field plates.

Thus, changes in field strength and in field plate spacing are compensated for by the control circuits 28 and 32. Since the voltage across the C-field plates depends only upon the characteristics of the molecule in the molecular beam, the frequency of the oscillator and the C-field strength, all of which are maintained constant to a high degree of precision, the present invention constitutes a voltage standard. Of course, calibration must be made against some absolute standard.

The voltage divider 34 is placed across the C-field plates in order to provide a standardized output voltage at values less than the total voltage maintained across the plates.

Obviously many modifications and variations of the present invention are possible in the light of the above teachings. It is therefore to be understood that within the scope of the appended claims the invention may be practiced otherwise than as specifically described.

I claim:

1. In combination with molecular beam electric resonance apparatus having separated plates for establishing a D.C. field through which the molecular beam travels, apparatus for providing a fixed output voltage of voltage-standard accuracy comprising means connected to said resonance apparatus superimposing upon said D.C. field an A.C. field controlled for frequency stability, means connected to said resonance apparatus maintaining the strength of said D.C. field at a constant value, and means connected to at least one said plate maintaining the distance between said plates at a constant value, the value of the voltage across said plates being maintained at a constant value by such control of the frequency of the A.C. field, the strength of the D.C. field and the distance between said plates.

2. In combination with molecular beam electric resonance apparatus having separated plates for establishing a D.C. field through which the molecular beam travels, apparatus for providing a fixed output voltage of voltage-standard accuracy comprising means connected to said resonance apparatus for superimposing upon said D.C. field and A.C. field controlled for frequency stability, feedback means connected to said resonance apparatus maintaining the strength of said D.C. field at a constant value, and means connected to at least one said plate maintaining the distance between said plates at a constant value, the value of the voltage across said plates being maintained at a constant value by such control of the frequency of the A.C. field, the strength of the D.C. field and the distance between said plates.

3. Molecular beam apparatus for providing a fixed output voltage of voltage-standard accuracy comprising, in combination: molecular-beam, electric resonance means including plates for establishing a homogeneous D.C. field through which the molecular beam travels and including means for converting said melocular beam into a proportionate electric current; oscillator means connected to one of said plates superimposing upon said D.C. field an oscillating field controlled for frequency stability; connections for a source of stable D.C. supply voltage, said D.C. supply connections being connected to said resonance means for establishing the necessary D.C. fields; field control means connected to said current converting means, said D.C. supply connections and said resonance means controlling the amount of D.C. supply voltage applied to said plates so that the strength of said D.C. field is maintained at a constant value; plate-separation control means coupled to at least one of said plates maintaining the spacing between said plates at a constant value, the voltage across said plates, which depends upon the characteristics of the molecules in said molecular beam, the strength of said field and the spacing between said plates being maintained constant by such control of oscillator frequency, D.C. field strength and plate spacing.

4. Apparatus as set forth in claim 3, wherein said plate to which said oscillator means is connected is formed in two sections electrically insulated from each other, the output of said oscillator means being connected across said sections.

5. Apparatus as set forth in claim 3, wherein said field control means comprises an electronic amplifier and an impedance connected as a load impedance for said amplifier, said load impedance also being connected in series with said D.C. supply connections, the circuit being arranged so that the voltage applied to said plates is the difference between the supply voltage and the voltage across the load impedance, the output from said current converting means being connected as an input to said field control means in such manner that changes in molecular beam intensity due to changes in field strength cause changes in voltage across said load impedance and therefore changes in supply voltage applied to said plates in such direction as to compensate for the original change in field strength.

6. Apparatus as set forth in claim 3, wherein said plates are formed of optical glass coated on the facing surfaces with a semi-transparent conductive film and said plate-separation control means comprises a light source, a light projection system projecting said light through said plates, a photocell, an amplifier connected to receive the output of said photocell, a metal rod connected to one of said plates, and a heating coil wrapped around said rod and connected to the output of said amplifier, the light falling on said photocell being in the form of interference fringes from said plates, any change in the spacing of said plates causing a movement of said interference fringes and a change in the output of said photocell which results in a change of current through said heating coil whereby said rod expands or contracts to move the plate to which it is connected in such direction as to compensate for the original change in spacing of said plates.

No references cited.